United States Patent [19]

Thoma

[11] 4,375,078

[45] Feb. 22, 1983

[54] DATA TRANSFER CONTROL CIRCUIT

[75] Inventor: Donald E. Thoma, Mt. Prospect, Ill.

[73] Assignee: GTE Automatic Electric Labs Inc., Northlake, Ill.

[21] Appl. No.: 247,962

[22] Filed: Mar. 26, 1981

[51] Int. Cl.³ .............................................. G06F 3/00
[52] U.S. Cl. ................................................... 364/200
[58] Field of Search ... 364/200 MS File, 900 MS File

[56] References Cited

U.S. PATENT DOCUMENTS 4,012,718  3/1977  Young et al. .................... 364/200
4,130,883  12/1978  Hazelton ........................... 364/900
4,200,936  4/1980  Borzcik et al. ................... 364/900

Primary Examiner—Mark E. Nusbaum
Assistant Examiner—Thomas M. Heckler
Attorney, Agent, or Firm—Robert J. Black; Frank J. Bogacz

[57] ABSTRACT

This circuit provides a minimally sized bidirectional asynchronous automatic interface between a high speed data processing system and one of a plurality of data terminal devices.

7 Claims, 2 Drawing Figures

DATA TRANSFER CONTROL CIRCUIT

BACKGROUND OF THE INVENTION (1) Field of the Invention

The present invention pertains to bidirectional asynchronous data transmission and more particularly to a circuit for controlling said asynchronous data transmissions between a data processing system and a data terminal.

(2) Description of the Prior Art

Data processing systems can transfer data from their memory units at high rate of speed, typically in the microsecond range. On the other hand, data terminal equipment has a potentially lower transfer rate usually in the millisecond range. Therefore, when the data processing system transmits information to a data terminal, the data processor of the processing system incurs a great deal of dead-time or time during which the processor must wait for the terminal due to the disparity of transmission times. Data terminal devices range from teleprinting devices providing a hard copy to CRT's which provide information displayed upon a screen.

The information transmission between a processor and a data terminal takes the form of a parallel transmission called a data word. The processor may transmit a data word to a data terminal device and then wait for the data terminal device to print or display that word before transmitting subsequent words. This is a very inefficient transmission scheme since the processor incurs considerable dead-time while waiting for the data terminal to print or display the word. Some data processing systems alleviate this problem by initiating a word transmission to several data terminals and then returning to the first data terminal to initiate a second transmission to it, etc. However, the drawback of that configuration is that the processor must establish proper protocol to transmit to the data terminal. Establishing protocol requires time for each data terminal and thereby the data processor spends considerable time in establishing protocol to the plurality of data terminals.

As a solution to this problem, buffering is introduced between the data processor and the data terminal device. This buffering forms a part of the data transfer control circuit. Logic is required to control the operation of this buffer along with the receiver transmitter device for converting serial data to parallel and vice versa. As an option to providing logic the data processor may control each step of the data transfer control circuit. For the same reason that was mentioned above this scheme is also inefficient. Therefore, hardware logic as part of the data transfer control circuit is most suitable.

Some hardware configurations which attempt to solve this problem comprise a microprocessor and necessary support components. Such solutions are inefficient for a small number of data terminals since the entire microprocessor configuration must be provided even for a single data terminal. Other hardware configurations control the data transfer by timing components. Such solutions are small in size and may be modular but, are subject to high failure rates inherent in multiple stage timing devices due to the multiplying of timing tolerances.

Another solution is shown in FIG. 2. FIG. 2 shows the data processing system connected to a FIFO data buffer 10 and a universal asynchronous receiver/transmitter 51 connected to the data buffer 10 and to a data terminal. The control circuit logic comprising gates 21-25, JK flip-flop 30, five bit shift register 40 and gates 41-45 is connected between the data buffer 10 and the universal asynchronous receiver/transmitter (UART) 51. This solution employs a 5 bit shift register 40 for controlling the sequence of operations. The latches comprised of gates 21-24, gate 25 and JK flip-flop 30 provide the timing intervals between the control pulses and determine the duration of these pulses. The shortcoming of this solution is that it would require 18 integrated circuit packages in addition to the FIFO buffer and UART. Furthermore, the solution would require seven separate integrated circuit device types. Still further, this circuit exhibits the timing difficulties mentioned above due to the use of the shift register.

Accordingly, it is the object of the present invention to provide a minimally sized automatic asynchronous bidirectional interface between a high speed data processing system and a data terminal device.

It is another object of the present invention to provide a data transfer control circuit which minimizes the amount of dead-time of the data processing system while transmitting to a data terminal.

It is further object of the present invention to minimize the number of times that protocol must be established between the data processor and a particular data terminal.

It is yet another object of the present invention to provide a modular configuration which may grow efficiently according to the number of data terminals in the data processing system.

SUMMARY OF THE INVENTION

The present invention comprises a bidirectional asynchronous interface between a data processing system and a data terminal. The data transfer control circuit taught herein is composed of a receive section and a transmit section. The transmit section transfers data from the data processing system to the data terminal and the receiving section transfers data from the data terminal to the data processing system. The arrangement set forth herein provides a minimum gate configuration providing for buffering and conversion of data between a data processing system and a data terminal.

Initially, the transmitting portion of the data transfer control circuit will be explained. A data buffer of the data transfer control circuit is connected between the data processing system and a parallel to serial converter. Each connection comprises a parallel data bus. In addition, certain control signals are transmitted via leads between the data buffer and the data processing system. The parallel to serial converter is also connected to the data terminal.

A first gate is connected to the data buffer and the converter. The output lead of the first gate is connected to a latch. The latch provides two of the leads with complimentary steady state signals. One lead is connected to the data buffer and the other lead is connected to a second gate. The second gate has an output lead which is connected to the parallel to serial converter. There is also included a clock which is connected to the data buffer, the latch, the second gate and the parallel to the serial converter.

The data flows in a burst from the data processing system to the data buffer, where the data is subsequently transmitted one word at a time to the parallel to serial converter for retransmission to the data terminal device in a serial form. The first gate detects the burst of data transmitted from data processing system to the data buffer. When the first gate detects that the parallel to serial converter is ready to transmit, a signal is transmitted from the first gate to the latch via the lead connecting them. The signal of the first output lead of the latch takes on a first steady state value. The second output lead of the latch transmits the complimentary steady state signal to the second gate which combines the signal with the signal transmitted from clock to produce a signal instructing the converter to receive one data word. Simultaneously, the signal transmit along the first output lead of the latch instructs the data buffer to shift out one parallel data word for transmission to the converter. Subsequently, the converter transmits the serial data to the data terminal. When the data word is transmitted from the data buffer to the converter, the first gate has its output signal change states and the outputs of the latch change states in response to this signal. Thereby, transmission of other data words is inhibited until the converter is ready to accept another data word. At this time, the above mentioned process is repeated.

Next, the receiving portion of the data transfer control circuit will be explained. A serial input lead connects a data terminal to a serial to parallel converter. The serial to parallel converter of the receiving section and the parallel to serial converter of the transmitting section comprise one physical device. The serial to parallel converter converts and stores data bits until a predetermined number of bits have been collected. A parallel data bus is connected between the converter and a data buffer between a second parallel data bus is connected along with the control leads between the data buffer and the data processing system.

A first gate is connected between the converter, the data buffer and a latch. The latch is connected to the data buffer and the second gate. The second gate is connected to the converter. The clock mentioned in the transmitting section above is also connected to the converter of the receiving means, the latch of the receiving means and the second gate of the receiving means. In addition, there is a further connection from the data processing system to the data buffer of the receiving and transmitting means and the latch of the receiving and transmitting means for resetting each of these devices.

As the data terminal transmits serial data to the converter, it is collected and stored. When a full data word has been collected, the converter transmits a signal to the first gate indicating it is ready to transmit the data word. The first gate combines this signal with a signal from the data buffer indicating that the data buffer is ready to receive said data word. In response to this signal of the first gate, the output leads of the latch take on complimentary steady state values. The first lead has its signal take on a value indicating that the data buffer is to receive a data word; and, the second output of the latch takes on a value indicating to the second gate that the second gate may remove a data word from the converter to the data buffer so that the converter may receive subsequent words. The above cycle is repeated until a number of words have been received from the data terminal and stored in the data buffer. Via control leads connected between the data buffer and the data processing system, the data processing system may receive all stored words in the data buffer in one burst, thereby emptying the data buffer. The data buffer may now be filled again by the converter. As a result, the handling time required by the data processor is kept to a minimum and the number of components required to perform this function is kept to a minimum.

It is to be noted that the transmit and receive latches are operated by the same periodic pulses as the converters. This avoids multiple countdown networks in the clock and simplifies the number of different clock output signals.

DESCRIPTION OF THE PREFERRED EMBODIMENT

Figure 1:
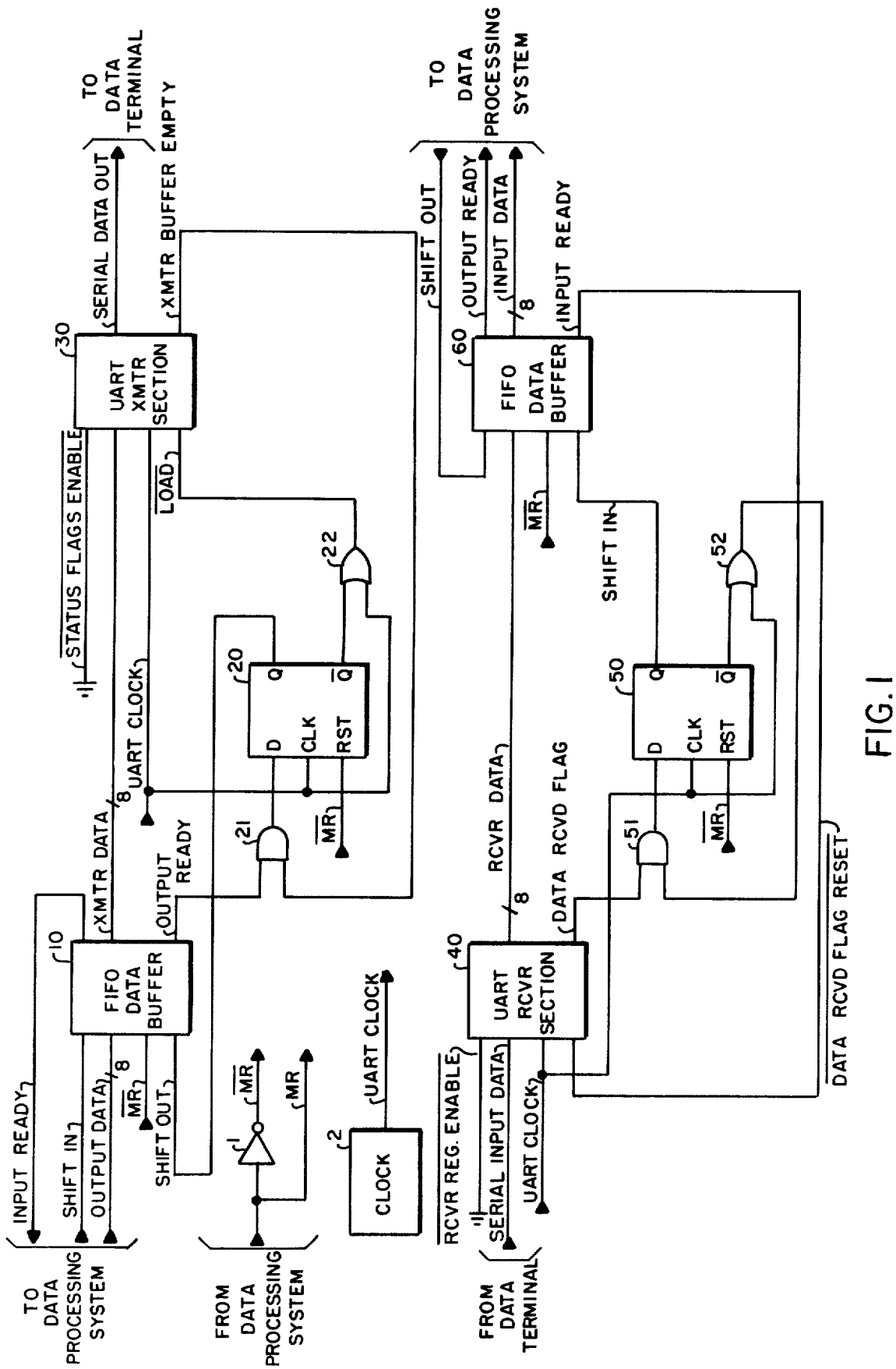
FIG. 1 is a schematic diagram of a data transfer control circuit embodying the principles of operation of the present invention.
Figure 2:
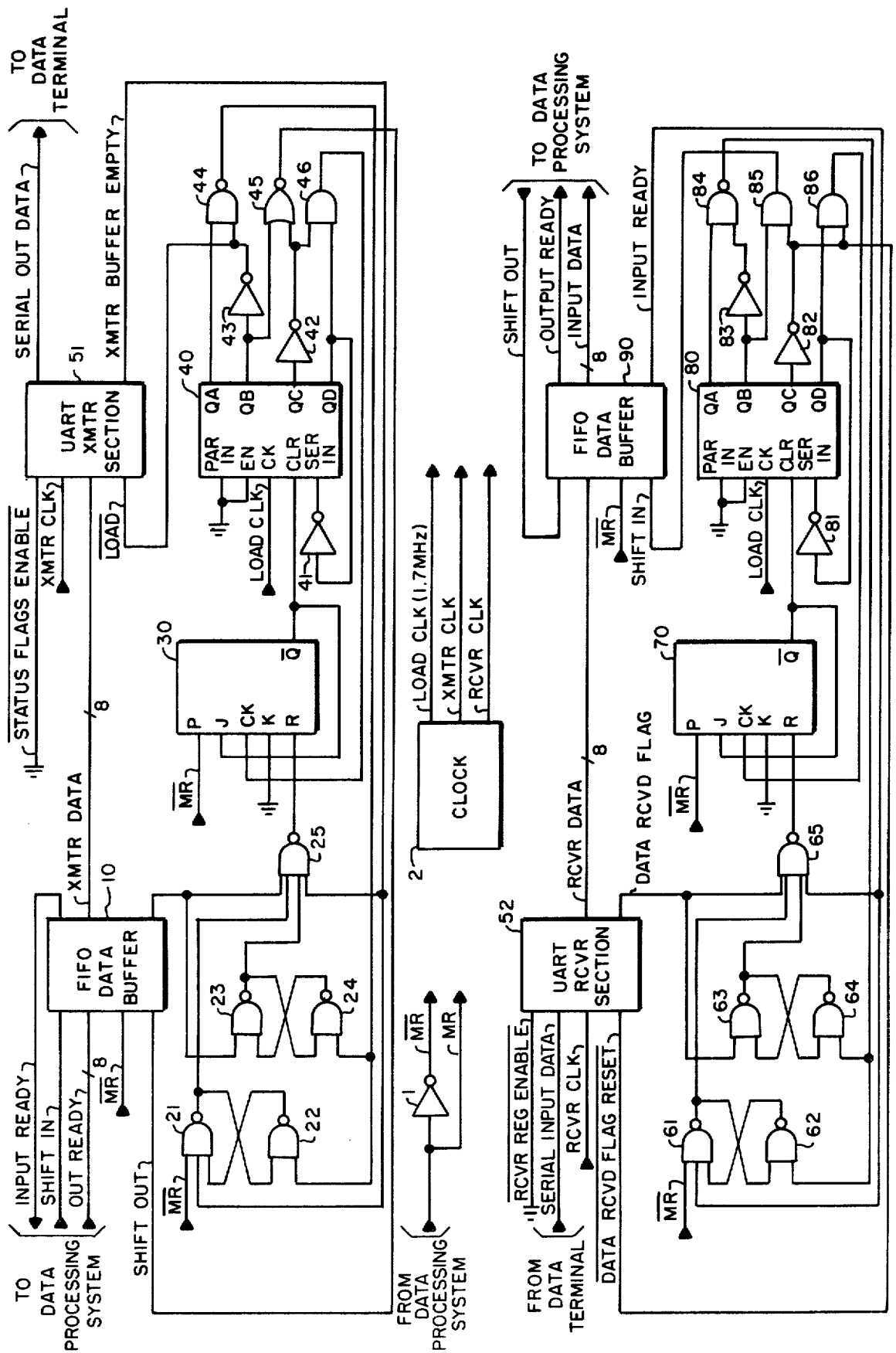
FIG. 2 is a schematic diagram representing the prior art.

Referring to FIG. 1, the data transfer control circuit embodying the present invention is shown. The upper portion of the schematic diagram indicates the circuitry of the transmitting portion of the data transfer control circuit and the lower portion of the schematic corresponds to the receiving portion of the data transfer control circuit.

First, the transmitting portion of the circuit will be explained. The data processing system is connected to first in first out (FIFO) data buffer 10 via an 8 bit wide output data bus. Additionally, input ready lead and shift in lead connect the data buffer 10 to the data processing system and serve to facilitate the data between the data processing system and buffer 10. A second 8 bit wide data bus xmtr data connects the buffer 10 to the universal asynchronous receiver/transmitter (UART) transmitter section 30. This portion of the UART device converts parallel data to serial data. UART 30 is connected via a serial out data lead to the data terminal. Buffer 10 is further connected to AND gate 21 via the output ready lead and UART 30 is connected to AND gate 21 via the xmtr buffer empty lead. AND gate 21 is connected to edge triggered type flip-flop 20 via the data input. Flip-flop 20 has its Q output connected to the shift out input of buffer 10 and its $\overline{Q}$ output connected to OR gate 22; OR gate 22 has its output lead connected to the $\overline{load}$ input of UART 30. Clock 2 which provides periodic pulses of a single predetermined frequency is connected to flip-flop 20, OR gate 22 and UART 30. Flip-flop 20 and UART 30 are driven by the same periodic pulses, thereby avoiding separate countdown networks and clock connections. The system is initialized via a signal on the MR lead connected to buffer 10 and flip-flop 20.

Via the input ready and shift in leads the data processing system transmits a predetermined number of data words to FIFO data buffer 10 in a single burst. At this time since the xmtr buffer empty lead and output ready leads will both be logic "1" and gate 21 transmits a logic "1" to the data input of flip-flop 20. Upon the next periodic pulse of clock 2 flip-flop 20 is set. Thereby, a level shift on the Q output of flip-flop 20 is transmitted via the shift out lead to buffer 10 which causes a data word to be transmitted along the xmtr data bus. The $\overline{Q}$ output of flip-flop 20 is transmitted to OR gate 22 and this gate is nonoperated due to the $\overline{Q}$ output and the value of the pulse transmitted by clock 2. When the clock signal is removed the output of OR gate 22 is transmitted via the $\overline{load}$ lead to UART 30 at which time the data on the xmtr data bus is latched within the UART xmtr section 30. The time duration from the application to the removal of the clock pulse to OR gate 22 allows a sufficient set up time for UART 30 to stabilize. Simultaneously, the output ready lead has changed value to logic "0" since data is being removed from FIFO data buffer 10. Upon the application of the next clock pulse flip-flop 20 is reset since the output ready lead has changed value and removed the signal from the data input. In turn, this causes the flip-flop 20 to remove the load signal from the UART 30 and simultaneously removes the signal from the shift out lead to the buffer 10. The UART 30 is then permitted to convert the parallel data to serial and transmit this data to the data terminal.

The value of the output ready lead is now at logic "1" so AND gate 21 will remain nonoperated until xmtr buffer empty lead also takes on the value of logic "1" indicating that UART 30 has transmitted the entire data word. Upon the occurrence of xmtr buffer empty lead being value logic "1" the process as set forth above will be repeated and subsequent data words transmitted. This process will continue until all words stored in the data buffer have been transmitted by the UART 30. The data processor is then able to fill the data buffer 10 for another transmission.

Next, the receiving portion of the data transfer control circuit will be explained. A data terminal is connected via serial input data lead to UART receiver section 40. UART 40 is connected via receiver data bus to FIFO data buffer 60. A second 8 bit wide data bus input data is connected between buffer 60 and the data processing system. Leads shift out and output ready further connect the data processor to the buffer 60 and facilitate the transmission of data between them. UART 40 is connected via the data received flag to AND gate 51 and, in addition, buffer 60 is connected via the input ready lead to AND gate 51. AND gate 51 is connected to the data input of flip-flop 50. Flip-flop 50 has its Q output connected via the shift in lead to buffer 60. In addition, the Q̄ of flip-flop 50 is connected to OR gate 52 which in turn has its output connected to UART 40 via the data received flag reset lead. Clock 2 has its periodic pulses transmitted via the clock lead to UART 40, flip-flop 50, and OR gate 52. Flip-flop 50 and UART 40 are driven by the same periodic pulser, thereby avoiding separate countdown networks and clock connections. The data processing system is further connected to buffer 60 and flip-flop via the MR lead.

As data is transmitted serially via the serial input data lead to UART receiver section 40, it is collected until a full 8 bit data word is formulated. When a full data word has been received by UART 40, a logic "1" is transmitted via the data received flag to AND gate 51. And since data buffer 60 is empty a logic "1" signal is transmitted via the input ready lead to AND gate 51. The signals are combined by AND gate 51 to produce a logic "1" signal to be transmitted to the data input of flip-flop 50. At the next periodic pulse from clock 2 flip-flop 50 is set. A logic "1" value is transmitted from the Q output of flip-flop 50 via the shift in lead to data buffer 60 thereby causing the data transfer from UART 40 via the receiver data bus to the data buffer 60 to occur. This action causes the input ready lead to take on the value logic "0", thereby rendering AND gate 50 nonoperated and removing the data input from flip-flop 50. During the period when the clock pulse is removed OR gate 52 provides a logic "0" via the data received flag reset lead to UART 40. In response the data received flag now takes on the value of logic "0".

At the next clock pulse flip-flop 50 is reset which removes the signals from the shift in lead and the data received flag reset leads. The UART 40 buffer 60 and flip-flop 50 are now in their original state and other subsequent data received by UART 40 may be transmitted in a manner similar to that described above. When data buffer 60 is filled with data, a logic "1" is placed on the output ready lead to the data processing system and the data processing system may now operate the buffer 60 via the shift out lead to remove all such data.

UART transmitter section 30 and UART receiver section 40 comprise one physical device and may be implemented with an integrated circuit part number TMS6011 manufactured by the Texas Instruments Corporation. All FIFO data buffers are 64 words by 8 bits and may be implemented with integrated circuits part number 74LS222 manufactured by the Texas Instruments Corporation.

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A data transfer control circuit, including a transmitting and a receiving section, for transmitting data words from a data processing system to a data terminal and for receiving data words from said data terminal for transmission to said data processing system, said data transfer control circuit connected between said data processing system and said data terminal, said data transfer control circuit comprising:

a clock for providing periodic pulses of a predetermined frequency;

said transmitting section comprising:

a first buffer connected to said data processing system and operated to store said data words transmitted from said data processing system;

converter means for converting parallel data to serial data, said converter means connected to said data terminal and to said first buffer;

first gating means connected to said first buffer and to said converter means, and operated in response to said first buffer to produce a first signal;

latching means connected to said clock, to said first gating means and to said first buffer, operated in response to said first signal to produce a second signal and a third signal;

said first buffer operated in response to said second signal to transfer a data word to said converter means;

second gating means connected between said latching means and said converter means and connected to said clock, and operated in response to said third signal to produce a fourth signal; and said converter means operated in response to said fourth signal to store said transferred data word from said first buffer temporarily, to convert said data word to serial data and to transmit said data word to said data terminal;

said receiving section comprising:

second buffer for storing data, connected to said data processing system;

said converter means for converting serial data to parallel data and temporarily storing a data word for transmission, and said converter means further connected to said data terminal and to said second buffer;

third gating means connected to said second buffer and to said converter means and operated in response to said converter means to produce a fifth signal;

flip-flop means connected to said clock, to said third gating means and to said second buffer, and operated in response to said fifth signal to produce a sixth signal and a seventh signal;

fourth gating means connected between said flip-flop means and said converter means and connected to said clock, and operated in response to said seventh signal and said clock to produce an eight signal;

said converter means operated in response to said eight signal to transfer said data word to said second buffer for storage; and said second buffer operated in response to said sixth signal to receive said data word transferred from said converter means and to store said data word for subsequent transmission to said data processing system via said second buffer.

2. A data transfer control circuit as claimed in claim 1, wherein:

said first gating means is connected to said converter means, and operated in response to said converter means whereby said latching means is reset for transmitting others of said data words to said data terminal via said converter means.

3. A data transfer control circuit as claimed in claim 1, wherein:

said third gating means is connected to said second buffer, and operated in response to said second buffer whereby said flip-flop means is reset for transmitting others of said data words to said data processing system via said second buffer.

4. A data transfer control circuit as claimed in claim 1, wherein:

said first gating means and said third gating means each include an AND gate.

5. A data transfer control circuit as claimed in claim 1, wherein:

said latching means and said flip-flop means each include an edge triggered D-type flip-flop.

6. A data transfer control circuit as claimed in claim 1, wherein:

said second gating means and said fourth gating means each include and OR gate.

7. A data transfer control circuit as claimed in claim 1, wherein:

said clock is connected in common to said latching means, said converter means and to said flip-flop means, whereby said latching means, said converter means and flip-flop means are each operated in response to said periodic pulses.

* * * * *